Patented June 6, 1939

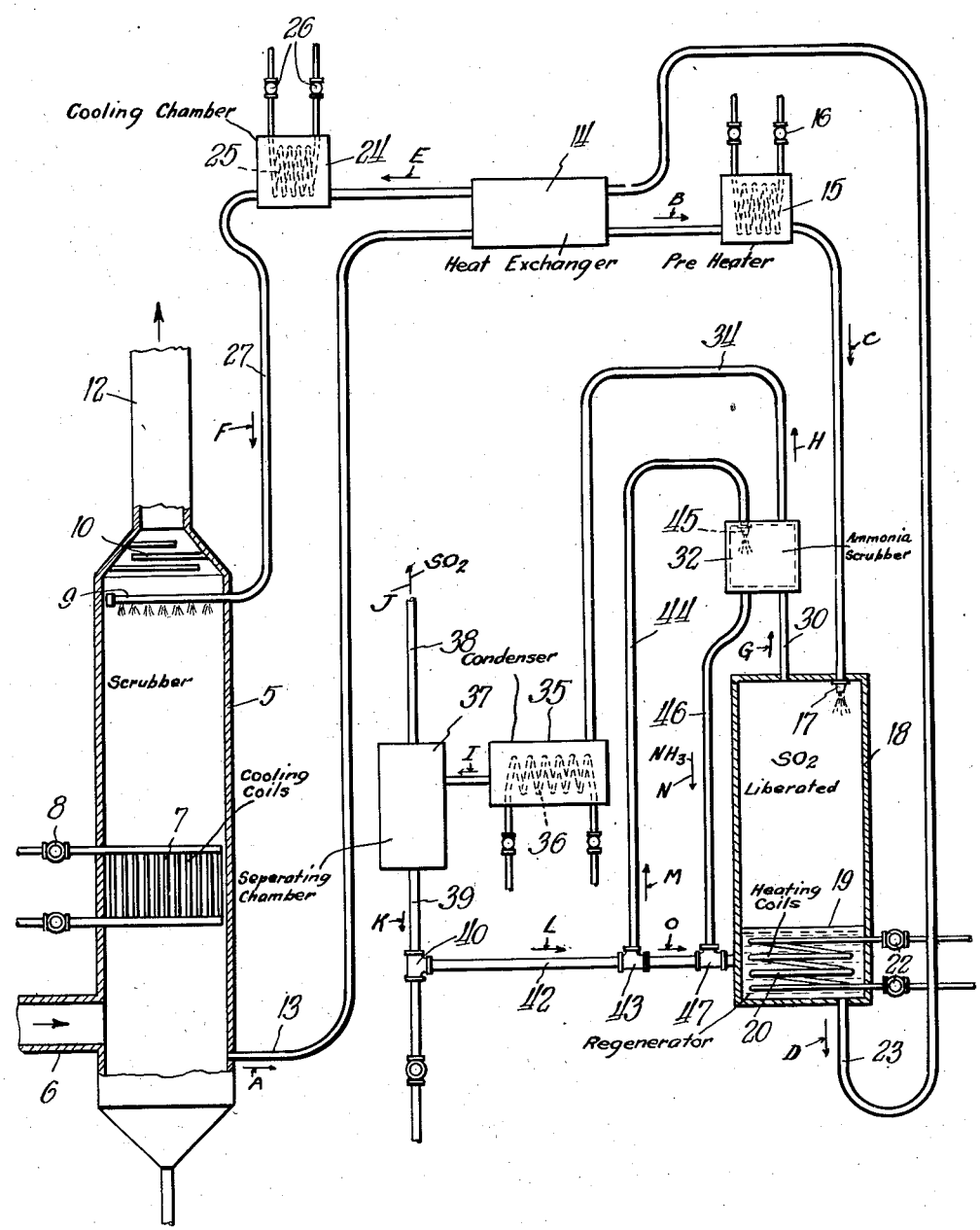

2,161,055

UNITED STATES PATENT OFFICE 2,161,055

RECOVERY OF $SO_2$ FROM AMMONIUM SULPHITE SOLUTIONS

Henry F. Johnstone and Alamjit D. Singh, Urbana, Ill., assignors, by mesne assignments, to Commonwealth Edison Company, Chicago, Ill., a corporation of Illinois Application August 24, 1936, Serial No. 97,550

15 Claims. (Cl. 23—178)

This invention relates to the removal and recovery of sulphur dioxide from waste gases, and more particularly to the removal of absorbed sulphur dioxide from an ammonium sulphite-bisulphite solution.

In the pending application of Henry F. Johnstone, Serial No. 55,713, filed December 23, 1935, there is disclosed an ammonium sulphite-bisulphite regenerative process for removing sulphur dioxide from waste gases. This process, in general, comprises the selective absorption of sulphur dioxide from waste gases into an aqueous ammonium sulphite-bisulphite solution in an evaporative scrubber or cooler, and the driving off of the absorbed sulphur dioxide and regeneration of the solution by heat. The absorption takes place at a relatively low temperature and the regeneration takes place at a relatively high temperature.

We have found that solutions of ammonium sulphite and bisulphite saturated with the sulphur dioxide from a gas containing only a small concentration of this constituent, under 10% for example, has a slight vapor pressure of ammonia at temperatures above 70° C. In the regeneration of such solutions by heating, in order to recover the sulphur dioxide, a trace of ammonia will be present in the vapors leaving the regenerator.

It is an object of the present invention to prevent contamination of the sulphur dioxide recovered by eliminating, as far as possible, any trace of ammonia in the recovered gas.

Another object of the present invention is to eliminate the loss of ammonia which might be carried off with the sulphur dioxide, and to return this ammonia to the absorbing solution.

In practice, to attain these objects, we have found it desirable to contact the vapors leaving the regenerator with an aqueous solution of sulphurous acid which readily absorbs any ammonia gas that is driven off. As a convenient source for this sulphurous acid solution we employ the condensate from these vapors, although in fact the mere condensation of water is sufficient to accomplish this removal of the ammonia gas.

This condensate, containing the removed ammonia gas, is then returned to the ammonium sulphite-bisulphite solution, as will be described hereinafter.

In certain cases it may be preferred for economic or other reasons that the $SO_2$ in the condensate be wasted rather than recovered. In such a case it is desirable to use as small a portion of the condensate as possible, since the amount of sulphur dioxide that dissolves in the condensate, in excess of that equivalent to ammonia, is roughly proportional to the amount of the condensate. It is therefore expedient to remove the ammonia before the vapors reach the condenser by passing them over absorbing surfaces wetted with a small fraction of the condensate. An amount of water substantially equivalent to the remainder of the condensate is then added to the cycle.

Another advantage of the present regeneration process results from the relative volatilities of the various components. We have found that, for the concentration ratios in a solution of ammonium sulphite-bisulphite saturated with the sulphur dioxide at a temperature for which the equilibrium vapor pressure of water over the solution is greater than the partial pressure of sulphur dioxide in the gases, the volatilities of the three components range in descending order as follows—water, sulphur dioxide, ammonia. By volatility is meant the ratio of the partial pressure of a vapor to its mole fraction in the solution. Since the process is designed to remove the sulphur dioxide from the solution with the minimum steam requirement, the vapors leaving the regenerator should be as rich in this component as possible. It follows, therefore, that the feed to the regenerator should enter the top of the column and not at some lower point, as is the usual practice, when concentrating a more volatile constituent in a vapor. Since any condensate returned to the top of the stripping column would tend to concentrate water, rather than sulphur dioxide, in the vapors leaving the regenerator, it is apparent that the condensate should be returned to the bottom of the column and not to the top.

Another important advantage secured by the present invention is the disposal of the condensate, including that fraction containing the ammonia removed from the vapors. It is common practice, in the separation of a gas from a solution with which it combines chemically, such as in the separation of carbon dioxide from a solution of sodium bicarbonate, to return any condensate to a line carrying the regenerated solution from the boiler. On account of the volatility of the ammonia in the present process, however, we have found that when the solution is heated indirectly rather than by direct addition of steam from an external source substantially all of the water condensed, or its equivalent as make-up water, must be re-introduced into the cycle at the bottom of the regenerator column, i. e., into the boiling pot, rather than combined with the regenerated solution at some posterior point, in order to conserve the steam required for regeneration and also to keep the height of the regenerator column within practical limits. We therefore introduce the fraction of the condensate passing through the ammonia scrubber into the regenerator boiling pot, together with the remainder of the condensate from the vapors leaving the regenerator or the equivalent of make-up water.

While the invention is described in connection with the absorption and recovery of sulphur dioxide, the main objective of the present process is the absorption and recovery, from waste gases, of an acidic constituent of the gases wherein the partial pressure of the constituent in the vapors leaving the regenerator is less than that of water, and employing a solution in which the absorbing agent constitutes a salt of a volatile alkali.

Other objects and advantages of the present invention will be more fully disclosed in the following detailed description, which, taken in conjunction with the accompanying drawing, will disclose to those skilled in the art the operation of the process as embodied in a preferred form of our invention.

The drawing discloses a diagrammatic layout of the process as embodied in a preferred form of our invention.

Referring now in more detail to the drawing, there is indicated at 5 a scrubber or absorption tower which may be of any desired type, and which has the inlet 6 for admitting waste gases containing sulphur dioxide or gases containing any acidic gas, such as sulphur dioxide, carbon dioxide, or hydrogen sulphide, into the lower end of the scrubber. This gas is passed over the cooling coil 7, controlled by the valve 8, and then upwardly in countercurrent contact with the absorbing solution projected from the distributors 9. The treated gases, with the sulphur dioxide removed, pass through suitable baffles 10 and outwardly to exhaust through the outlet conduit 12.

The solution projected from the distributors 9, which absorbs the sulphur dioxide during its downward movement, and which also assumes approximately the temperature of the cooling coil 7 in its downward movement, is withdrawn through the conduit 13 from the scrubber 5 as indicated by the arrow A, and from this conduit 13 passes into a suitable heat exchanger 14. From the heat exchanger 14 the extracting solution, preferably an ammonium sulphite-bisulphite solution, as indicated by the arrow B passes through a preheating coil 15 controlled by the valve 16, and thence as indicated by the arrow C through suitable distributor means 17 into the top of the regenerator chamber 18, which may be of the packed type. In this chamber, the extracting solution is contacted by the vapors rising from the heated solution indicated at 19 in the bottom of the tank. This solution may be heated by steam coils 20, by a submersion heater, by direct injection of steam, or in any other suitable manner, the effective amount of heating being controlled by any suitable valve mechanism 22.

In the regeneration chamber 18, the extracting solution is heated to a temperature such that the absorbed sulphur dioxide is liberated therefrom, and the regenerated solution passes outwardly from the bottom of the chamber 18 through the conduit 23 as indicated by the arrow D and back through the heat exchanger 14, whereby the heat of the regenerated solution is effective to impart a certain amount of heat to the extracting solution passing from the conduit 13 into the heat exchanger 14. From the heat exchanger 14 this solution passes as indicated by the arrow E into the cooling chamber 24, which is provided with the cooling coils 25 controlled by the valves 26, the solution being cooled to approximately the required absorption temperature in the chamber 24. From the cooling chamber the regenerated solution, which has now been brought down to the proper absorption temperature, is introduced as indicated by the arrow F to the distributors 9 through the conduit 27.

The solution entering the chamber 5 is a solution having a certain optimum concentration of ammonium sulphite and ammonium bisulphite, determined in accordance with the disclosure of the above mentioned application, Serial No. 55,713, filed December 23, 1935, which concentration is optimum for the various conditions of operation affecting the process, such as the efficiency of the absorption tower and regenerator chamber, the absorption temperature, the regeneration temperature, and the concentration of the sulphur dioxide in the gases being treated.

The sulphur dioxide vapor, together with water vapor and traces of ammonia, passes from the regenerator chamber 18 through the conduit 30 as indicated by the arrow G into what we term an ammonia scrubber 32. In the scrubber 32, the ammonia gas is removed from the vapors and the sulphur dioxide passes outwardly through the conduit 34 as indicated by the arrow H, together with the water vapor. The vapors passing through the conduit 34 enter the condenser 35, which is provided with suitable cooling coils 36, wherein the water vapors and any other constituents are condensed, the condensate and the sulphur dioxide passing as indicated by the arrow I into the separating chamber 37. In this separating chamber, the sulphur dioxide passes outwardly through the conduit 38 as indicated by the arrow J, while the condensate is drained off as indicated by the arrow K through the conduit 39 to the feed connection 40, this condensate then passing as indicated by the arrow L through the conduit 42 back toward the regenerator chamber 18. This water, formed in the condenser 35, may have incorporated therein a certain amount of sulphur dioxide, which converts a portion of the water condensate into a dilute condensate of sulphurous acid.

Through a suitable restricting member 43, a fraction of this condensate is passed as indicated by the arrow M through the conduit 44 to the distributor 45 located in the ammonia scrubber 32. The scrubber 32 may be provided with absorbing surfaces, which are wet by the condensate distributed thereon by the distributor 45. The vapors entering the chamber 32 from the conduit 30 come in contact with the condensate, and the ammonia is removed from these vapors prior to their passage outwardly of the chamber as indicated by the arrow H through the conduit 34. The condensate, with the ammonia absorbed thereinto, is exhausted as indicated by the arrow N from the chamber 32 through the conduit 46, and through the connection 47 joins the main condensate stream indicated by the arrow O entering the boiling pot of the regenerator column 18.

In order to conserve steam required for regeneration, it is distinctly advantageous to introduce the condensate into the liquid 19 in the chamber 18, on account of the volatility of the ammonia, and also because of the relative concentration ratios in a solution of the type employed in the present process, since any condensate which would be returned to the top of the chamber 18 would tend to concentrate water, rather than sulphur dioxide, in the vapors which leave the regenerator through the conduit 30. We thus provide for return of all water vapor leaving the chamber 18, together with any traces of ammonia which may be in the liberated sulphur dioxide, back into the chamber 18 below the liquid level thereof.

In case it is not desirable to return any more $SO_2$ in the condensate than that required in the ammonia scrubber, the amount of condensate returned is controlled by the metering constriction at the member 43 and an amount of water equivalent to that in the remainder of the condensate is added to the liquid 19 in the chamber 18 (connections not shown). It is therefore desirable, as disclosed by the present process, to remove the ammonia before the vapors reach the condenser, which is accomplished by passing them over the absorbing surfaces in the chamber 32 which are wetted with a small fraction of the condensate, before the vapors reach the condenser 35. If desired, water, rather than condensate, may be passed into the chamber 32, in place of a portion of the condensate, in order to remove any traces of ammonia in the vapors, this water then being returned to the regenerated solution.

We are aware that various changes in the structural arrangements of the present process are possible without departing from the underlying principles of the invention, and we therefore do not intend to limit our invention to the exact layout illustrated, but only in so far as defined by the scope and spirit of the appended claims.

We claim:

1. A process for separating sulphur dioxide from a solution of ammonium sulphite and bisulphite wherein the vapor pressure of sulphur dioxide over the solution entering the separator is less than that of water, which comprises contacting said solution in a regenerator with vapors containing steam, condensing a portion of the steam, returning said condensed portion into contact with the vapors issuing from said regenerator to remove ammonia gas from said vapors, separating the condensate from said vapors, and returning it to said regenerator at a point below the level of the regenerated solution therein.

2. A process for separating sulphur dioxide from a solution of ammonium sulphite and ammonium bisulphite wherein the vapor pressure of sulphur dioxide over the solution entering the separator is less than that of water, which comprises contacting said solution with vapors containing steam, condensing a portion of the steam after said contacting, returning said condensed portion into contact with the vapors after said contacting to remove ammonia gas from said vapors, separating said condensate from said vapors, and returning it to said separator at a point below the level of the regenerated solution therein.

3. A process for separating sulphur dioxide from a solution of ammonium sulphite and bisulphite wherein the vapor pressure of sulphur dioxide over the solution entering the separator is less than that of water, which comprises heating said solution, contacting the hot solution in a regenerator column with vapors rising from boiling said solution, condensing a portion of the steam, returning said condensed portion into contact with the vapors issuing from said regenerator to remove ammonia gas from said vapors, separating the condensate from said vapors, and returning the separated condensate to said regenerator at a point below the level of the boiling solution therein.

4. A process for separating sulphur dioxide from a solution of ammonium sulphite and bisulphite wherein the vapor pressure of sulphur dioxide over the solution entering the separator is less than that of water, which comprises contacting said solution with vapors containing steam in a regenerator column, condensing said steam posterior to said column, returning a portion of said condensate into contact with the vapors issuing from said regenerator to remove ammonia gas from said vapors, separating said portion of said condensate from said vapors, and returning all of said condensate to said regenerator at a point below the level of the regenerated solution therein.

5. A process for separating sulphur dioxide from a solution of ammonium sulphite and bisulphite wherein the vapor pressure of sulphur dioxide over the solution entering the separator is less than that of water, which comprises heating said solution, contacting the hot solution in a regenerator with vapors resulting from boiling the solution leaving the regenerator by the direct introduction of steam into the solution, condensing a portion of the steam in the vapors leaving said regenerator, returning said condensed portion into contact with the vapors issuing from said regenerator to remove ammonia gas from said vapors, separating the condensate from said vapors, and returning it to said regenerator at a point below the level of the regenerated solution therein.

6. A process for separating sulphur dioxide from a solution of ammonium sulphite and bisulphite wherein the vapor pressure of sulphur dioxide over the solution entering the separator is less than that of water, which comprises contacting the hot solution in a regenerator with vapors containing steam, condensing substantially all of the water from the vapors externally of the regenerator, returning a portion of the condensate into contact with the vapors issuing from the regenerator to remove ammonia gas therefrom, separating said condensate from said vapors, combining said portion with the remainder of said condensate, and returning the combination to said regenerator at a point below the level of the regenerated solution therein.

7. A process for separating sulphur dioxide from a solution of ammonium sulphite and bisulphite wherein the vapor pressure of sulphur dioxide over the solution entering the separator is less than that of water, which comprises contacting said solution with vapors containing steam in a regenerator, condensing a portion of the steam, returning said condensed portion into contact with the vapors issuing from said regenerator to remove ammonia gas from said vapors, separating the condensate from said vapors, combining said portion with an amount of water equivalent to that in the remainder of the condensate, and returning said combined condensate water to said regenerator at a point below the level of the regenerated solution therein.

8. A process for separating sulphur dioxide from a solution of ammonium sulphite and bisulphite wherein the vapor pressure of sulphur dioxide over the solution entering the separator is less than that of water, which comprises contacting the vapors issuing from a regenerator, into which said solution has been introduced, with a small amount of water to remove the ammonia gas from said vapors, separating the resulting solution from the vapors, and returning it to said regenerator at a point below the level of the regenerated solution therein.

9. A process for separating sulphur dioxide from a solution of ammonium sulphite and bisulphite wherein the vapor pressure of sulphur dioxide over the solution entering the separator is less than that of water, which comprises contacting the vapors issuing from a regenerator with a small amount of water to remove the ammonia gas from said vapors, separating the resulting solution from the vapors, condensing substantially all of the water in the vapors issuing from the regenerator column, and returning said resulting ammonia solution to said regenerator at a point below the level of the regenerated solution therein.

10. A process for separating sulphur dioxide from a solution of ammonium sulphite and bisulphite wherein the vapor pressure of sulphur dioxide over the solution entering the separator is less than that of water, which comprises contacting said solution in a regenerator with vapors containing steam, condensing substantially all of the water in said vapors externally of said regenerator, contacting said vapors issuing from said regenerator with a portion of said condensate, and returning all of said condensate to said regenerator at a point below the level of the regenerated solution therein.

11. A process for separating sulphur dioxide from a solution of ammonium sulphite and bisulphite wherein the vapor pressure of sulphur dioxide over the solution entering the separator is less than that of water, which comprises introducing a preheated solution near the top of a stripping column, contacting the hot solution in the column with vapors containing steam, condensing a portion of the steam in said vapors and returning it into contact with said issuing vapors, separating said portion from said vapors, and returning said portion to the stripping column at a point below the level of the regenerated solution therein.

12. A process for separating sulphur dioxide from a solution of ammonium sulphite and bisulphite wherein the vapor pressure of sulphur dioxide over the solution entering the separator is less than that of water, which comprises preheating said solution, introducing the preheated solution near the top of a stripping column, contacting the hot solution in the column with vapors containing steam, condensing the steam in said vapors externally of said column, contacting said issuing vapors with a portion of said condensate, separating the resulting solution from said vapors, combining said resulting solution with the remainder of said condensate, and returning said combination to said stripping column at a point below the level of the regenerated solution therein.

13. The process of removing and recovering sulphur dioxide from waste gases containing the same, which comprises contacting said gases with a relatively cool solution of ammonium sulphite and bisulphite, heating said solution, introducing said solution into a regenerator in contact with steam, contacting the issuing vapors from said regenerator with water to remove ammonia gas from said vapors, separating the resulting solution from said vapors, and returning said solution to said regenerator at a point below the level of the regenerated solution therein.

14. The process of removing and recovering sulphur dioxide from waste gases containing the same, which comprises contacting said gases with a solution of ammonium sulphite and bisulphite to absorb said sulphur dioxide therein, preheating said solution containing said absorbed sulphur dioxide, introducing said heated solution into a regenerator in contact with steam, condensing the water in the vapors issuing from said regenerator, contacting said vapors with a portion of said condensate, combining said portion of said condensate with the remainder of said condensate, and returning all of said condensate to said regenerator at a point below the level of the regenerated solution therein.

15. The process of removing and recovering sulphur dioxide from gases containing the same, which comprises contacting said gases with a relatively cool solution of ammonium sulphite and bisulphite to absorb the sulphur dioxide thereinto, introducing said solution with the absorbed sulphur dioxide therein into a regenerator in contact with steam, contacting the vapors issuing from said regenerator with a small amount of water to remove the ammonia gas from said vapors, separating the resulting solution from the vapors and returning it to said regenerator at a point below the level of the regenerated solution therein, and introducing an amount of water equivalent to that issuing from the regenerator with said vapors into the regenerated solution.

HENRY F. JOHNSTONE.
ALAMJIT D. SINGH.